United States Patent Office 2,863,751
Patented Dec. 9, 1958

2,863,751

IGNITION COMPOSITIONS FOR MATCHES, STRIKING SURFACES AND THE LIKE

Tore Björn Ledaal, Oslo, Norway

No Drawing. Application July 28, 1955
Serial No. 525,062

Claims priority, application Norway August 18, 1954

3 Claims. (Cl. 52—27)

The present invention relates to ignition compositions, i. e. compositions suitable for use in match heads and the like, as well as in striking surfaces for the same, and the object of the invention is to provide compositions suitable for the preparations of products presenting an outstandingly high water resistance.

In the art of match-manufacturing it is a well known fact that the binding agent or glue used is of a decisive importance to a successful match production. In particular, the glue used in match heads is to fulfill very specific requirements. Up to the present time, hide glue, in spite of its rather high cost and its lack of water resistance, has been considered the best. Many attempts have been made in order to arrive at water resistant binding agents, thereby also subjecting hide glue to hardening processes in order to render it water resistant, but none of the suggestions made has resulted in any substantial success. In view of the great development in the field of binding agents during recent years, this fact is rather remarkable, and may be due to the very severe requirements which a suitable glue for a match head must fulfill. Of such requirements the following are of particular importance.

(1) The different components of the match head should be firmly bound together.

(2) The match head should firmly adhere to the wood or paper match-splint, which is previously impregnated with a hydrocarbon compound.

(3) The match head should be hard but not brittle.

(4) The match head should present a proper grade of porosity in order not to "sputter" when ignited.

(5) The match head should burn well, with a moderate burning rate, and give no soot or smoke evolution.

(6) Further, the glue should lend itself easily to the preparation process, have a good pot life and the proper dipping and drying qualities.

In addition the glue has to be water resistant, cheap, and not imparting either additional fire or health hazards, or troubles to the manufacturing process. When used in match striking surfaces, the binding agent likewise has to make the compositions fulfill specific requirements, some of which coincide with those of match head glue. In order to provide waterproof striking surfaces even when deposited on paper, the binding agent must impregnate the paper base and impart sufficient wet strength to the same.

One single binding agent fulfilling all the requirements mentioned has until the present time not been found, and it is not likely that it ever will be found.

The object of the present invention is therefore to prepare a binding agent composition comprising in combination constituents individually favouring the different requirements, thereby endeavouring to reach the best possible compromise between the same. In this manner new and useful results are achieved.

According to the invention the compositions comprise the following constituents:

(a) At least one thermosetting binding agent of the thermosetting amino plastic binding agent type in the form of a B-stage condensation product of melamine- or urea-formaldehyde resin. The function of this constituent is to impart water resistance to the composition.

(b) At least one non-hardening water dispersible binding agent, such as a thermoplastic polymerisation product with the general formula $(CH_2CHR)_n$, wherein R is H, OH, Cl, $CH_3COO$, $C_6H_5$; or a vegetable binding agent with the aid of which it is possible to adjust the viscosity and burning properties and alone or in combination with the other constituents provide film-forming qualities. An example of the thermoplastic product is polystyrene in the form of an aqueous emulsion and an example of the vegetable binding agent is dextrine.

(c) An ammonium hydrogen sulfite cellulose waste liquor preferably concentrated to powder form which makes the composition as a whole very cheap, and improves its quality as an ignition composition binding agent.

The different constituents are preferably used in the form of powders which are easily dispersible in ordinary tap water.

An additional specific feature of the present compositions is that they do not comprise water soluble chromium compounds. Friction agents, such as powdered glass may be omitted from the compositions, as the binding agent itself provides a sufficient friction effect. Thus, even matches of the safety type will be ignited by scratching them on paper which has been treated with the present binding agent composition.

Other interesting and most preferable features of the present binding agent compositions are the following.

When used in the preparation of striking surfaces, it imparts water proofness both to the striking surface per se, and to the paper on which it is deposited. The striking surfaces are of outstanding quality, are not brittle, and are not attacked by solvents.

When used in match heads the compositions impart sufficient porosity to the inner parts of the heads, and give them a closed nice outer surface, looking substantially as having been treated with a lacquer.

Much higher drying temperatures than ordinary may be used, to the effect that the production speed may be increased.

By varying types and relative quantities of the non-hardening binding agent, a wide range of qualities may be obtained.

The relative amounts of the three main constituents (or binding agent types) used may differ, but is usually about ⅓ of each.

Examples of formulae of binding agent compositions:

(1a) 35% by weight melamine-formaldehyde
(1b) 32% by weight dextrine
(1c) 33% by weight ammonium hydrogen sulfite waste (dry form)
(2a) 35% by weight melamine-formaldehyde
(2b) 35% by weight polystyrene emulsion
(2c) 30% by weight ammonium hydrogen sulfite waste (dry form)

Water is the only solvent and thinner ordinarily used in the preparation of the compositions. When using compositions like those mentioned above as a binding agent, the ignition compositions may be composed as follows:

(I) *Match head composition*

| | Parts by weight |
|---|---|
| Potassium chlorate | 62 |
| Sulphur | 3 |
| Manganese dioxide | 2 |
| Silicious earth | 3 |
| Zinc oxide | 6 |
| Powdered glass | 13 |
| Binding agent composition | 11 |
| | 100 |

Water is added in a quantity amounting to about 30% of the total.

(II) *Match striking surface composition*

| | Parts by weight |
|---|---|
| Amorphous phosphorus | 45 |
| Antimony sulphide (black) | 10 |
| Binding agent composition | 45 |
| | 100 |

Water to desired consistency.

All constituents may be ground together in an ordinary mill, or the binding agent composition may be dispersed separately in water, and added to a water paste comprising the other constituents.

Drying temperature should be raised gradually to at least 240° F. (Electric heating is to be preferred.) Drying time: About 20 minutes for match heads and 60 seconds for match striking surfaces.

I claim:

1. An ignition composition for matches and striking surfaces, comprising a binding agent consisting essentially of about ⅓ each of (a) a product selected from the group consisting of B-stage melamine-formaldehyde and B-stage urea-formaldehyde, (b) at least one non-hardening water dispersible binding agent selected from the group consisting of (1) a thermoplastic polymerization product consisting of ($CM_2CHR$) units wherein R is a member selected from the group consisting of H, OH, Cl, $CH_3COO$ and $C_6H_5$ and (2) dextrine, and (c) an ammonium hydrogen sulfite cellulose waste liquor product.

2. An ignition composition according to claim 1 wherein (a) is a B-stage melamine-formaldehyde.

3. An ignition composition according to claim 2 wherein (a) is a B-stage urea-formaldehyde.

References Cited in the file of this patent

UNITED STATES PATENTS

| 1,127,410 | Croser | Feb. 9, 1915 |
| 2,128,368 | Larsson | Aug. 30, 1938 |
| 2,635,954 | Daley | Apr. 21, 1953 |